United States Patent [19]

Jenkins

[11] 4,447,078

[45] May 8, 1984

[54] METHOD FOR RETAINING AIR PRESSURE IN A DUCT SYSTEM

[76] Inventor: James H. Jenkins, 6010 N. 26th St., Arlington, Va. 22207

[21] Appl. No.: 478,661

[22] Filed: Mar. 25, 1983

[51] Int. Cl.³ .................... F16L 25/00; F16L 55/00
[52] U.S. Cl. .................................. 285/331; 285/424
[58] Field of Search .................. 285/331, 424, 371

[56] References Cited

U.S. PATENT DOCUMENTS 2,916,054 12/1959 Callan .......................... 285/424 X
4,294,476 10/1981 Nash ............................. 285/424 X Primary Examiner—Richard J. Scanlan, Jr.

[57] ABSTRACT

An S slip with openings along one edge to allow air to pass through, and a foam sealant to seal corners of a duct connection.

4 Claims, 7 Drawing Figures

U.S. Patent  May 8, 1984  4,447,078
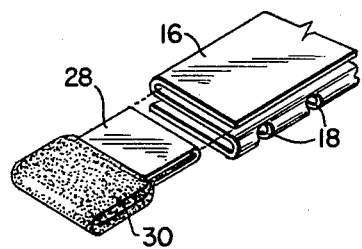
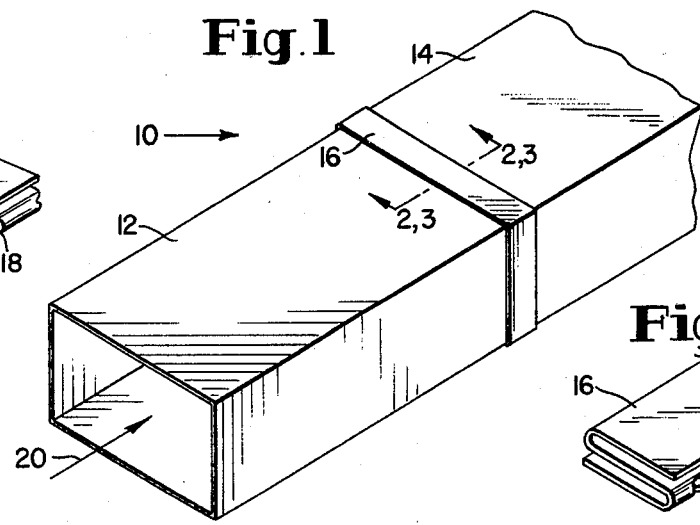
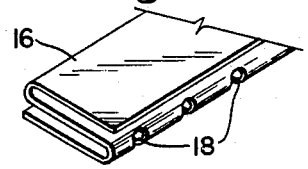
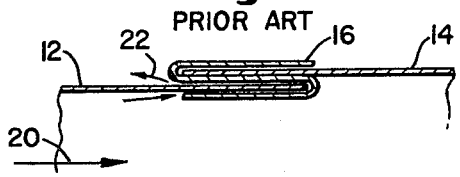
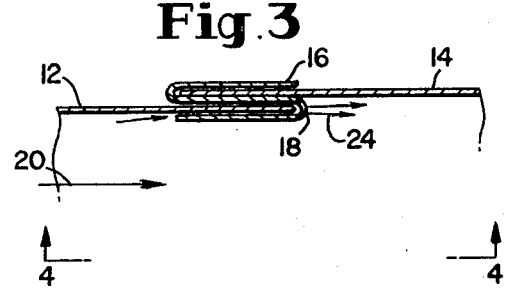
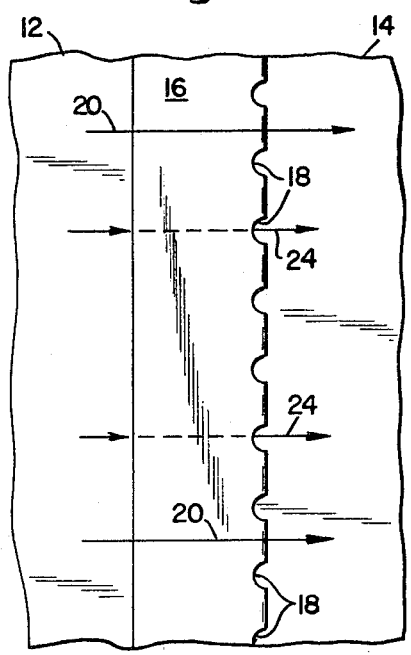
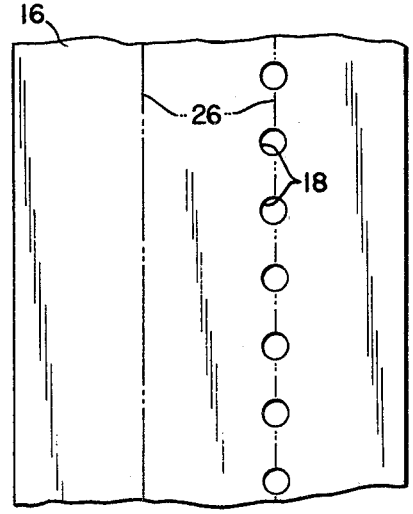

METHOD FOR RETAINING AIR PRESSURE IN A DUCT SYSTEM

BACKGROUND OF THE INVENTION

The S slip has been in use to make connection on a duct system for many years. Because of the shape of an S slip when the pressure is high the section of the S slip that is in the air stream acts as a scoop and allows the air to escape out of the duct. This new S slip with openings along one edge allows the air to pass through the S slip and back into the duct. The sides of the duct are connected with a drive slip. Because of the way the S slip and drive come together at the corners it leaves an opening. In order to make a tight connection, we insert the U shape metal holder with a sealant into the end of the S slip. When the drive slip is knocked over the S slip the sealant, which can be made of fiberglass, makes a tight connection.

OBJECTS OF THE INVENTION

The primary object of this invention is to seal a duct connection in order to keep the air and air pressure in the duct system.

DESCRIPTION OF THE DRAWINGS

These and other objects and advantages of the invention will become apparent from a study of the following specification when viewed in the light of the accompanying drawings, in which:

FIG. 1 Perspective view of a typical air duct 10 system showing one duct S slip 16 clip connection two section sections of duct 12-14

FIG. 2 A cross section (fragmentary) taken along lines 2—2 of FIG. 1 showing a prior art version of a duct clip 16 in place.

FIG. 3 A view similar to FIG. 2 showing the new duct slip 16 in place.

FIG. 4 A view from the inside of a duct taken along lines 4—4 of FIG. 3 showing air flow and potentially leaked air being returned to the normal air path inside the duct.

FIG. 5 A plan view of a piece of blank duct clip before bending showing holes on one fold line.

FIG. 6 Fragmentary perspective of an S slip showing location of holes in S slip.

FIG. 7 Fragmentary perspective view of an S slip with an end sealing member ready to be inserted where it will seal a corner.

DETAILED DESCRIPTION

As shown in FIG. 1 a typical duct assembly 10 with two sections of duct 12-14 connected with a prior art S slip 16 and showing direction of air flow 20.

FIG. 2 is showing prior art S slip 16 with a section of duct 12-14 inserted into the S slip 16 and showing air escaping through S slip 16 as shown by 22 caused by air pressure flow 20.

FIG. 3 showing new S slip 16 with openings 18 along edge to allow air to pass through from duct section 12 to duct section 14 as air pressure 20 forces air through S slip 16 as shown by 24.

FIG. 4 is showing an S slip 16 with openings 18 to allow air to pass through openings 18 as shown by 24.

FIG. 5 is a flat S slip 16 with openings 18 before passing through machine to be formed into an S slip.

FIG. 6 is an S slip 16 with openings 18 to allow air to pass through S slip 16 keeping air in duct 12-14 at all times.

FIG. 7 is a plyable material 30 secured within a flat metal holder 28 to be placed in the ends of an S slip 16 so that when a drive slip is bent over it will make a tight connection. The invention description is best understood by a study of the disclosure as shown in the drawing. Here the S slip joint 16 is used to couple two air duct sections 12 and 14 in a manner well known in the art. A sheet of metal as shown in FIG. 5 is folded to form three folds and two receiving grooves. In addition to the drawing disclosure the use of slip joints is well known in the prior art as shown in the patent to Zack (Ser. No. 1935690) and the one to Burghart (Ser. No. 3,246918). It is interesting to note that in addition to teaching how to couple duct sections, both of these patents addressed the issue of gas leakage at the coupled area. The solution taught by these references is to insert packing material at the fold walls to arrest the leakage of air that enters the grooves formed by the S folds. In the instant invention, the problem is resolved by placing apertures in one of the fold walls of the slip joint. These apertures as shown at 18 in FIG. 5 may be of any convenient diameter and spacing across the length of the metal strip that forms the S slip joint. Those shown in the drawing are approximately ¼ of the width of a fold in diameter and approximately ½ of the width of a fold apart. They are drilled along one of the fold walls prior to machining the metal strip into an S slip joint. The apertured fold wall forms a portion of the interior groove of the S slip joint as shown in FIG. 3 of the drawing and thus is able to allow for the passage of any gas air that enters the groove through the apertures into the connecting and overlapping duct 14. This arrangement prevents the loss of gas air into the atmosphere.

The S slip joint as shown in FIGS. 2 and 3 is formed to provide free movement of the edges of the duct sections into the respective grooves. This permits assembling of the sections at the construction site. In exchange for accepting this loose fitting structure, the system would have to accept a gas/air loss from the inner duct section to the outside of the conduit line at the connecting plane. This loss has become unnecessary by providing openings in the fold wall to permit the gas/air to pass through into the adjoining duct section. This arrangement is especially successful when the gas/air flow is in a direction that causes it to pass along the interior groove of the slip joint and then through the apertures as shown in FIG. 3 rather than first travelling through the apertures and then into the interior groove as with an opposite direction flow.

While in accordance with Patent Statutes, the preferred embodiments of the invention have been illustrated and described, it will be apparent to those skilled in the art that changes may be made without deviating from the inventive concepts set forth above.

What is claimed is:

1. An S slip joint for connecting duct sections of a gas/air conduit system comprising a sheet member bent into three folds to provide two grooves that open in opposite directions and are closed at their remote ends by fold walls which connect the outer folds to the center fold with each of said grooves being adapted to receive one of the edges of connecting duct sections in a slidable association and providing an easily assemblable relation ship between the abutting edges and the slip joint; one of the fold walls connecting the outer folds to the center fold containing apertures along the length thereof to permit fluid communication between the associated groove and the duct section received in the remaining groove when the connecting duct sections are positioned in the S slip joint.

2. A conduit line comprising a plurality of connecting duct sections coupled through S slip joints; each slip joint consisting of a three fold S shape member that provides two grooves that open in opposite directions and have fold walls at their remote ends connecting the outer folds to the center fold; apertures spaced along the fold wall of one of the grooves; each of the opposite edges of the connecting duct sections are mounted in the grooves of each S slip joint in a slidable and overlapping association with the groove having the apertured fold wall and the edge mounted therein being positioned inside of the outer duct sections to provide communication between duct sections through the fold wall apertures.

3. A conduit line according to claim 2 in which the S slip joint is positioned so that the apertured fold wall is downstream of the groove opening to permit gas/air flow between the groove and the downstream duct section.

4. A conduit line according to claim 2 in which the edges of the S slip joints along the direction of gas/air flow are sealed with a flexible packing material.

* * * * *